3,345,402
THIOCYCLOBUTANONES
James C. Martin, Kingsport, Tenn., assignor to Eastman Kodak Company, Rochester, N.Y., a corporation of New York
No Drawing. Filed July 1, 1963, Ser. No. 292,126
5 Claims. (Cl. 260—488)

This invention relates to organic chemistry. More particularly this invention relates to novel chemical compounds and to a novel method for their preparation.

The novel chemical compounds of the invention are thiocyclobutanones of the formula:

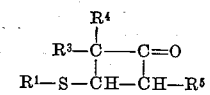

wherein $R^1$ can be an alkyl radical of 1 to about 12 carbon atoms, a mononuclear carbocyclic aryl radical having up to about 12 carbon atoms, an acycloxyalkylene radical of the formula:

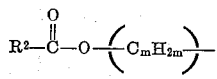

or a cyclobutanone radical of the formula:

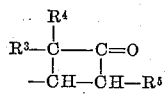

$R^2$ can be an alkyl radical of the formula $H(C_nH_{2n})$ or a radical of the formula

$R^3$ and $R^4$ can be the same or different and can be hydrogen, alkyl radicals having up to about 8 carbon atoms, mononuclear carbocyclic aryl radicals having up to about 12 carbon atoms or can collectively represent joined alkylene radicals which, together with the common carbon atom to which they are attached, form a saturated carbocyclic ring of 5 to 7 ring carbon atoms as in tetramethylene ketene, pentamethylene ketene, hexamethylene ketene, etc.; $R^5$ is a hydrogen atom or a lower alkyl radical having up to about 4 carbon atoms and each of $m$ and $n$ is an integer from 1 to about 4. The integers $m$ and $n$ are preferably 1 or 2.

$R^1$, when an alkyl radical of 1 to about 12 carbon atoms is typically a radical such as methyl, ethyl, propyl, butyl, pentyl, hexyl, heptyl, nonyl, decyl, undecyl, dodecyl, etc. and is preferably a lower alkyl radical, i.e., such a radical having up to about 4 carbon atoms.

$R^3$ and $R^4$, when alkyl radicals of 1 to 8 carbon atoms, are typically radicals such as methyl, ethyl, propyl, butyl, pentyl, hexyl, heptyl, octyl, etc., and are preferably lower alkyl radicals, i.e., such radicals having up to about 4 carbon atoms.

$R^1$, $R^3$ and $R^4$ can also be mononuclear aryl radicals such as phenyl or lower alkyl substituted phenyl radicals having up to about 12 carbon atoms, including such radicals having more than one lower alkyl substituent present on the phenyl ring. The lower alkyl substituents have 1 to about 4 carbon atoms.

The novel compounds can be prepared by the process of the invention which comprises combining a ketene of the formula:

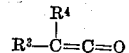

with a substituted or unsubstituted vinyl thioether of the formula:

wherein the substituents $R^3$, $R^4$ and $R^5$ have the meanings previously discussed; $R^6$ can be the radical $R^1$, a vinyl radical or a hydroxy alkylene radical of the formula $HO(C_mH_{2m})$ and $R^1$ and the integer $m$ have the meanings previously assigned to them.

Typical of the ketenes which are useful in the process of the invention are ketene; aldoketenes such as methyl ketene, ethyl ketene, propyl ketene, butyl ketene, pentyl ketene, hexyl ketene, heptyl ketene, phenyl ketene, 2-ethylhexyl ketene, octyl ketene, etc.; and ketoketenes such as dimethyl ketene, diethyl ketene, ethylmethyl ketene, butylethyl ketene, tetramethylene ketene, pentamethylene ketene, diphenyl ketene, methylphenyl ketene, etc.

Useful vinyl thioethers in the process of the invention are compounds such as methyl vinyl sulfide, ethyl vinyl sulfide, propyl vinyl sulfide, butyl vinyl sulfide, pentyl vinyl sulfide, isobutyl vinyl sulfide, ethyl-1-propenyl sulfide, divinyl sulfide, phenyl vinyl sulfide, 2-vinyl thioethanol, 2-vinyl thioethylacetate, etc.

The process of the invention can be carried out over a wide temperature range but the preferred temperature is from about 0° C. to about 180° C. In the case of ketene, diphenyl ketene and the lower monoalkyl and dialkyl ketenes temperatures of about 20° C. to about 40° C. are the most preferred. Temperatures above about 40° C. are frequently preferred for the less reactive higher ketoketenes. The process can be conducted with or without an inert solvent. Suitable solvents for use in the process of the invention include ethers, chlorinated hydrocarbons, esters, aliphatic hydrocarbons, aromatic hydrocarbons, etc.

The reactants are normally combined in a 1:1 molar ratio. However, the process can be carried out with an excess of the ketene or of the vinyl thioether. In the event the vinyl thioether contains another functional group which reacts with the ketene, e.g., a hydroxy group or a vinyl group, it is frequently desirable to employ two moles of ketene per mole of vinyl thioether.

The following examples illustrate the novel compounds and process of the invention.

*Example 1*

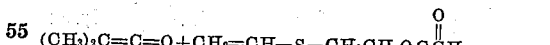

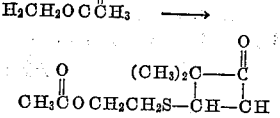

To a stirred solution of 146 g. (1.0 mole) of 2-vinyl-thioethanol, acetate in 300 ml. of hexane under nitrogen is added 70 g. (1.0 mole) of dimethylketene. After stirring for 24 hr. at room temperature, the reaction solution is distilled to recover a considerable amount of 2-vinylthioethanol, acetate and 88.5 g. (41%) of 3-(2-acetoxyethylthio)-2,2-dimethylcyclobutanone.

The 3-(2-acetoxyethylthio)-2,2-dimethylcyclobutanone prepared by this method has a B.P. of 119–124° C. (1.5 mm.), exhibits a strong infrared absorption at 5.65μ, characteristic of cyclobutanones and has the following analysis:

Calcd. for $C_{10}H_{16}SO_3$: C, 55.6; H, 7.4; S, 14.8. Found: C, 55.5; N, 7.4; S, 15.2.

*Example 2*

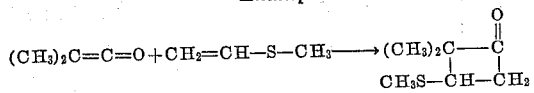

To a stirred solution of 37 g. (0.5 mole) of methyl vinyl sulfide in 150 ml. of ethylacetate is added 35 g. (0.5 mole) of dimethyl ketene at room temperature. After stirring for 10 hr. at room temperature, the reaction solution is distilled through a 10-in. packed column to give 45.5 g. (63%) of 2,2-dimethyl-3-(methylthio)cyclobutanone.

The 2,2-dimethyl-3-(methylthio)cyclobutanone prepared by this method has a B.P. of 92–95° C. (40 mm.) and exhibits a strong infrared absorption at 5.65μ.

*Example 3*

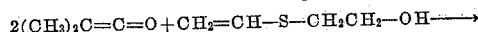

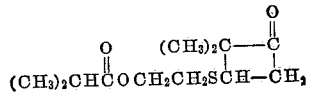

To a stirred solution of 104 g. (1.0 mole) of 2-vinylthioethanol in 400 ml. of tetrachloroethane is added 140 g. (2.0 moles) of dimethyl ketene. The temperature is kept at 25–45° C. by an ice bath during the addition. The solution is stirred for 5 hr. at room temperature. Distillation of the reaction solution through a 6-in. Vigreux column gives 173 g. (71%) of 3-(2-isobutyryloxyethylthio)-2,2-dimethylcyclobutanone.

The 3-(2-isobutyryloxyethylthio)-2,2-dimethylcyclobutanone prepared by this method has a B.P. of 131–133° C. (1 mm.).

*Example 4*

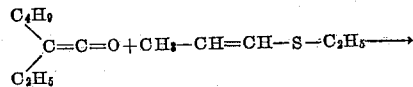

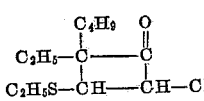

A solution of 8.2 g. (0.08 mole) of ethyl-1-propenyl sulfide and 10.2 g. (0.081 mole) of butylethylketene in 40 ml. of toluene is refluxed for 6 hr. Examination of the crude reaction solution by infrared shows a strong absorption at 5.65μ (cyclobutanone). The mixture is analyzed by gas chromatography and is found to consist of toluene, ethyl-1-propenyl sulfide, butylethylketene dimer, and the desired product. By use of a preparative scale gas chromatography column 0.5 ml. of the product peak is isolated and shown to be 2-butyl-2-ethyl-3-(ethylthio)-4-methylcyclobutanone.

The 2-butyl-2-ethyl-3-(ethylthio)-4-methylcyclobutanone prepared by this method has the following analysis:

Calcd. for $C_{13}H_{24}OS$: C, 68.5; H, 10.5; S, 14.0. Found: C, 68.6; H, 10.5; S, 14.2.

*Example 5*

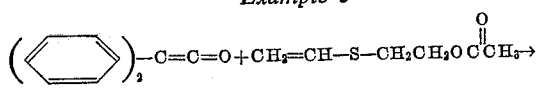

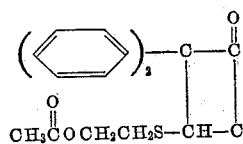

A mixture of 24 g. (0.124 mole) of diphenylketene and 18 g. of (0.124 mole) of 2-vinylthioethanol, acetate is allowed to stand for several days. The reaction is exothermic and seems to be almost complete in a few hours. The solution becomes quite viscous and slowly crystallizes. The yield of crude solid having a melting point of 86–89° C. is essentially quantitative. An analytical sample after recrystallization from ethanol melts at 90–91° C. Analysis indicates that this material is 3-(2-acetoxyethylthio)-2,2-diphenylcyclobutanone.

The 3-(2-acetoxyethylthio)-2,2-diphenylcyclobutanone prepared by this method has the following analysis:

Calcd. for $C_{20}H_{20}O_3S$: C, 70.5; H, 5.9; S, 9.4. Found: C, 70.7; H, 6.0; S, 9.5.

*Example 6*

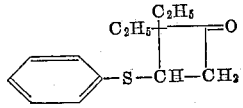

Using the general method described in Example 4, diethylketene and phenylvinyl sulfide give 2,2-diethyl-3-(phenylthio)cyclobutanone.

The 2,2-diethyl-3-(phenylthio)cyclobutanone prepared by this method has B.P. of 105–108° C. (2.5 mm.).

*Example 7*

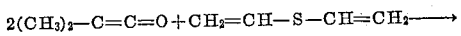

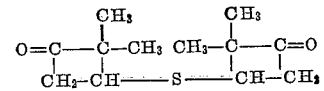

Using the general method described in Example 2, dimethylketene and divinyl sulfide give 3,3'-thiobis(2,2-dimethylcyclobutanone).

The 3,3'-thiobis(2,2-dimethylcyclobutanone) prepared by this method has B.P. of 148–154° C. (5 mm.).

*Example 8*

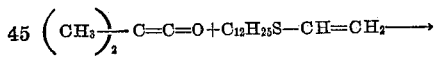

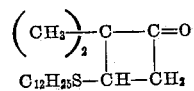

Using the general method described in Example 2, dimethylketene and dodecylvinylsulfide give 2,2-dimethyl-3-(dodecylthio)cyclobutanone.

The 2,2-dimethyl-3-(dodecylthio)cyclobutanone prepared by this method has a B.P. of 106–110° C. (15μ).

*Example 9*

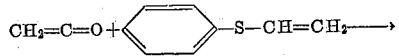

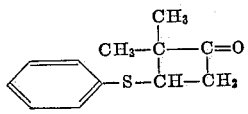

A solution of 21 g. of ketene and 68 g. of phenylvinylsulfide is heated in a stainless steel autoclave at 150° for 4 hr. Distillation of the reaction solution yields 3-phenylthiocyclobutanone.

*Example 10*

Under the general conditions of Example 4, the following ketenes and vinyl substituted vinyl thioethers react to give the product shown:

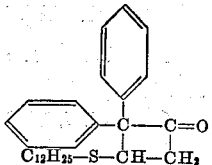

The novel compounds of the invention are useful as thermal stabilizers for various polymeric materials, e.g. polyolefins such as polypropylene, and are particularly useful as thermal stabilizers for poly(methylmethacrylate) resins.

The compound to be used as a thermal stabilizer can be incorporated into the polymeric material by milling them together on hot rolls or by other means known to the art.

When the polymerization reaction is not deleteriously affected by the presence of the thermal stabilizer, the stabilizer can be added to the reactants prior to polymerization.

The concentration of the stabilizer is generally about 0.001 to about 3 and preferably about 0.01 to about 1 part by weight per one hundred parts of polymer.

The following example illustrates the use of one of the novel compounds of the invention as a thermal stabilizer for poly(methylmethacrylate).

*Example 11*

Into a glass-lined reaction kettle is charged 10 g. of disodium acid phosphate, 25 g. of a 1% aqueous solution of the sodium salt of polymethacrylic acid, 10 g. of sodium hypophosphite, 2.2. g. of α,α'-azobis(isobutyronitrile). 550 g. of methylmethacrylate, 950 g. of water and 2 g. of 3-(2-acetoxyethylthio)-2,2-dimethylcyclobutanone. The reaction vessel is heated at 110–125° for several hours. The granular polymer is removed by filtration, washed and dried. The resulting polymer is heat treated in an oven at 125° for 12 hours. The moldings from this material have exceptional clarity. The molding powder shows superior thermal stability.

The invention has been described in considerable detail with particular reference to certain preferred embodiments thereof, but it will be understood that variations and modifications can be effected within the spirit and scope of the invention as described hereinbefore and as defined in the appended claims.

I claim:
1. Thiocyclobutanones of the formula:

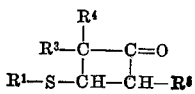

wherein $R^1$ is selected from the group consisting of:
(a) a mononuclear aryl radical of up to about 12 carbon atoms,
(b) a acyloxyalkylene radical of the formula:

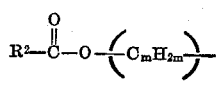

and (c) a cyclobutanone radical of the formula:

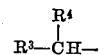

$R^2$ is selected from the group consisting of:
(a) an alkyl radical of the formula: $H\!-\!(C_nH_{2n})\!-\!$ and
(b) a radical of the formula:

$$R^3-\overset{R^4}{\underset{|}{C}}H-$$

$R^3$ and $R^4$ are selected from the group consisting of:
(a) hydrogen,
(b) an alkyl radical of 1 to 8 carbon atoms,
(c) a mononuclear aryl radical of up to 12 carbon atoms and
(d) joined alkylene radicals which, together with the carbon atom to which they are attached, form a saturated carbocyclic ring of 5 to 7 carbon atoms:

$R^5$ is selected from the group consisting of:
(a) hydrogen and
(b) a lower alkyl radical and
each of $m$ and $n$ is an integer from 1 to 4.

2. Thiocyclobutanones of the formula:

$$R^1-S-\underset{|}{CH}-\underset{|}{CH}-R^5$$
with $R^3-\overset{R^4}{\underset{|}{C}}-\overset{}{C}=O$ at top wherein $R^1$ is selected from the group consisting of:
(a) a mononuclear aryl radical of up to about 12 carbon atoms,
(b) an acyloxyalkylene radical of the formula:

$$R^2-\overset{O}{\underset{\|}{C}}-O-(C_mH_{2m})-$$

and
(c) a cyclobutanone radical of the formula:

$$R^3-\overset{R^4}{\underset{|}{C}}-\overset{}{C}=O$$
$-CH-CH-R^5$ $R^2$ is selected from the group consisting of:
(a) an alkyl radical of the formula: $H\!-\!(C_nH_{2n})\!-\!$ and
(b) a radical of the formula:

$$R^3-\overset{R^4}{\underset{|}{C}}H-$$

$R^3$ and $R^4$ are selected from the group consisting of:
(a) hydrogen,
(b) a lower alkyl radical,
(c) a mononuclear aryl radical of up to 12 carbon atoms and
(d) joined alkylene radicals which, together with the carbon atom to which they are attached, form a saturated carbocyclic ring of 5 to 7 carbon atoms;

$R^5$ is selected from the group consisting of:
 (a) hydrogen and
 (b) a methyl radical;
$m$ is 2 and $n$ is 1.

3. 3-(2-acetoxyethylthio)-2,2-dimethylcyclobutanone.

4. 3 - (2 - isobutyryloxyethylthio) - 2,2-dimethylcyclobutanone.

5. 3-(2-acetoxyethylthio)-2,2-diphenylcyclobutanone.

References Cited
UNITED STATES PATENTS

| | | | |
|---|---|---|---|
| 2,960,532 | 11/1960 | Gordon et al. | 260—476 |
| 2,964,554 | 12/1960 | Havens et al. | 260—476 |
| 2,980,646 | 4/1961 | Lappin | 260—45.85 |
| 3,022,268 | 2/1962 | Armitage et al. | 260—45.85 |
| 3,189,608 | 6/1965 | Martin | 260—586 |

OTHER REFERENCES

Adams et al.: Organic Reactions, vol. 12, 1962, pp. 26–27 and 48.

Conant Chemistry of Organic Compounds, 1939, p. 264.

RICHARD K. JACKSON, *Primary Examiner.*

LEON J. BERCOVITZ, LORRAINE A. WEINBERGER, *Examiners.*

M. J. WELSH, V. GARNER, *Assistant Examiners.*